United States Patent
Rose

(10) Patent No.: US 6,525,685 B1
(45) Date of Patent: Feb. 25, 2003

(54) METHOD AND APPARATUS FOR DETECTING AND ELIMINATING SIGNAL ANGLE-OF-ARRIVAL ERRORS CAUSED BY MULTIPATH

(75) Inventor: Conrad Rose, King George, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/026,724

(22) Filed: Dec. 27, 2001

(51) Int. Cl.$^7$ ................................. G01S 13/00

(52) U.S. Cl. ..................... 342/148; 342/156; 342/159

(58) Field of Search ......................... 342/146, 148, 342/147, 156, 159, 162

(56) References Cited

U.S. PATENT DOCUMENTS

| 4,449,127 A | * | 5/1984 | Sanchez .................. 342/148 |
| 4,965,732 A | | 10/1990 | Roy, III et al. |
| 5,568,394 A | * | 10/1996 | Krikorian et al. ........... 342/156 |
| 6,005,510 A | * | 12/1999 | Maurice et al. ............. 342/148 |

OTHER PUBLICATIONS

T. Kailath, "Lectures on Wiener and Kalman Filtering", Springer–Verlag, New York 1982, pp. 1–187.

Ralph Schmidt "Multiple Emitter Location and Signal Parameter Estimation", Proc. RADC Spectrum Estimation Workshop, Oct. 1979, pp. 243–258.

* cited by examiner

Primary Examiner—Thomas H. Tarcza
Assistant Examiner—Brian Andrea
(74) Attorney, Agent, or Firm—Lowe Hauptman Gilman & Berner, LLP

(57) ABSTRACT

This present invention advantageously eliminates the critical deficiencies of current multipath interferometer processing demonstrated in field testing. In particular the present invention substantially improves AOA estimation accuracy and reliability when utilizing super resolution algorithms. The present invention also overcomes the data-gap drawback of data editing methods, especially for emitters at low elevations. The present invention does this by detecting phase processing errors and substituting correct AOA estimates for the corrupt ones. In the preferred implementation, the detection and substitution time extends only slightly the super resolution or data editing processing time. By thus requiring little additional processing time, the present invention allows the interferometer to output accurate angle estimates at the receiver's emitter-revisit rate for all emitter-array geometries and signal polarizations. The present invention eliminates both the gross errors caused by abnormally large phase noise variance, typically created by diffuse multipath, and the interfering signal errors induced by specular multipath.

16 Claims, 9 Drawing Sheets

METHOD AND APPARATUS FOR DETECTING AND ELIMINATING SIGNAL ANGLE-OF-ARRIVAL ERRORS CAUSED BY MULTIPATH

FIELD OF THE INVENTION

The present invention relates generally to multipath radar interferometers, and more particularly, to a method and apparatus for detecting and eliminating signal angle-of-arrival (AOA) errors caused by multipath. More specifically, the present invention substantially improves AOA estimation accuracy and reliability when using super resolution algorithms.

BACKGROUND OF THE INVENTION

Ship borne search and track radars typically are directed to an emitter by azimuth and elevation coordinates generated from passive measurements in an electronic support (ES) subsystem. The ES system is said to cue the radar. Such cueing avoids time consuming radar target searches over a large volume of space, and hence minimizes the radar's time-to-range. The ES angle outputs may also be used to drive an emitter tracker.

To be effective in cueing, the ES system must direct the radar to numerous closely spaced targets. This requires azimuth and elevation angle measurement precision comparable to that of the radar. The preferred approach for obtaining this precision as depicted in FIG. 1, is an array of antennas 103 utilized as an interferometer. If the spacing between the outermost interferometer antennas is tens of signal wavelengths, the array can measure signal angle-of-arrival (AOA) to a fraction of a degree. The interferometer can do this over a wide field of view, and over a wide range of frequencies. For both cueing and tracking, the interferometer AOA outputs must be available at an output rate of several Hertz over a period of many seconds.

The interferometer measures the phase difference between pairs of antennas in the array. The signal angle-of-arrival resolution is related to this phase measurement by an accuracy proportional to the spacing $d_1$ 101 and $d_2$ 102 between the antenna pairs. Hence the requirement for spacings many wavelengths long. But when the antenna pair are more than half a wavelength apart, the phase measured is ambiguous modulo 360°. A special algorithm, typically tailored to the specific antenna spacings used in the array, must resolve these ambiguities before emitter AOA is found. Conventional ambiguity resolution algorithms (ARA) assume only one signal is present.

Unfortunately, many times in shipboard use this single-signal requirement is not met because of multipath. The presence of two or more simultaneous signals, such as strong specular or diffuse multipath, can cause spurious outputs. Diffuse multipath may produce large phase measurement noise, larger than the ambiguity resolution algorithm was designed to handle robustly. This noise can be so large it causes incorrect ambiguity resolution or "gross errors". When gross errors occur the resulting spatial errors can be on the order of tens of degrees.

Diffuse multipath affects mainly arrays oriented in azimuth, or with axis 104 parallel to the water's surface. Specular multipath does not affect a strictly azimuth array. But specular multipath has a profound impact on an interferometer used for elevation angle measurements, i.e. with axis 104 mounted normal to the reflecting surface. And, if the antenna platform is not stabilized, ship pitch and roll assures azimuth and elevation arrays are both affected by specular and diffuse multipath.

Specular multipath induces unacceptable phase errors in an elevation interferometer array by creating a second signal interfering with the direct path one. At low elevation angles these simultaneous interfering signals can be of nearly equal strength Antenna element beam shaping cannot mitigate this phenomenon sufficiently at low elevation angles. Since the ARA and ultimate interferometer AOA generating algorithm are based on measuring phase created by a single plane wave, specular multipath renders them useless for generating elevation measurements to cue the radar or provide angle estimates to a passive emitter tracker.

A straight forward multipath mitigation approach is phase measurement data editing. Specular multipath interference creates a standing wave detected at the array by the varying signal amplitude induced across the different antennas. So one method of data editing is to reject the phase measurements when the amplitude variation exceeds a predetermined threshold. Another method involves histogramming to determine outliers. But such data editing is not viable when cueing a radar or establishing emitter tracks. So many measurements may be rejected that large gaps in elevation angle output, averaging many seconds in length, can result. This is disastrous for cueing and tracking support. Reliable angle estimates at regular, predetermined intervals are required in these applications.

Therefore, the conventional interferometer algorithm must be augmented, especially for elevation processing, in a manner that recovers the direct path phase from multipath corrupted measurements. Currently this augmentation is typically done using a super resolution approach that separates the true signal from it's specular reflection. In particular, the MUiltiple SIgnal Classification (MUSIC) method, described by Schmidt in "Multiple Emitter Location and Signal Parameter Estimation," *Proc. RADC Spectrum Estimation Workshop,* October 1979, has been extensively studied for this application. When used for multipath processing the original MUSIC subspace approach had a drawback: the interfering signals must be uncorrelated. This is not the case for multipath. Multipath is the original signal simply shifted in phase and amplitude. But work-a-rounds have been introduced involving decorrelation by spatial averaging, and these work-a-rounds are referred to generically as modified MUSIC.

The spatial averaging is accomplished by implementing interferometer arrays with clusters of elements having certain symmetries. Roy, Paulraj and Kailaith detail the use of such spatial averaging in U.S. Pat. No. 4,965,732, "Methods and Arrangements for Signal Reception and Parameter Estimation." Their approach does not utilize MUSIC, but a super resolution algorithm based on the Estimation of Signal Parameters via Rotational Invariance Techniques (ESPRIT). ESPRIT has also been extensively studied for shipboard interferometer use.

MUSIC and ESPRIT are called subspace techniques because they utilize the fact that all signal vectors are orthogonal to all vectors in the measurement noise subspace. Dividing by the inner product of the candidate signal vector and noise space vectors, these algorithms generate peaks at the true signals. The peak would be at divide-by-zeros if there were no noise. But the presence of measurement error limits their magnitude. The magnitude of the peak is thus a function of the signal-to-noise ratio (SNR). When applying super resolution methods to the interferometer array processing application, where the array antennas are spaced several wavelengths apart, many peaks are generated besides the direct path signal and the multipath signal. Some peaks are caused solely by noise; some peaks appear at the interferometer's gross error points, or ambiguous AOAs; and some peaks, at higher frequencies, are caused by aliasing. Thus to work robustly, the super resolution approach, whether modified MUSIC, the implementation of ESPRIT disclosed by Roy, or some other subspace technique, must consistently determine which of the many possible outputs is the direct path. The success the method has doing this depends strongly on the direct and reflected signal SNR. When the two signals have comparable SNR, performance can degenerate dramatically for all current subspace approaches.

In the ship board radar cueing and tracking application, comparable SNRs occur often when the emitter is below 10° elevation. The reflected signal strength can also be particularly high when the emitter's signal is horizontally polarized. To assess the performance of subspace algorithms in the critical low elevation region, Litton Advanced Systems (LAS) conducted a field test with the array shown in FIG. 1 during the Fall of 1999. This array has a folded symmetry about horizontal line 100 to allow the use of a particular modified MUSIC spatial averaging method. Use of ESPRIT would have required a different configuration : an array with doublet pairs in subgroups having translational symmetry. But the resulting multipath performance in the low elevation region would have shown essentially the same degradation with any subspace approach using spatial decorrelation.

FIGS. 2a and 2b show the geometry of the test, the break down in conventional single signal ARA, and the result of super resolution processing. The test aircraft 200 in FIG. 2a flew various altitudes 205, e.g.1500, 750 and 200 feet, above the Chesapeake Bay, heading toward a vertical array 201, which was mounted on the water's edge. The elevation of the aircraft 200 when this particular test started was about 3° and, from navigation truth data was determined have the values shown in graph 210. The AOA output 206 from the single-signal interferometer algorithm 202, which attempted to estimate elevation 210 from the phase measurement data, had numerous specular 208 and some diffuse multipath induced errors. Some of the specular errors are indicated by data 207 in the AOA output 206. After processing with the modified MUSIC algorithm 203 in FIG. 2b, the errors 207 (FIG. 2a) were reduced in the elevation angle output 204 (FIG. 2b). But many errors 209 still remained: far too many to reliably cue a radar or passively establish the emitter track. In particular, the gross errors generated by conventional interferometer ambiguity resolution were a problem, and the argumentation of the conventional interferometer ambiguity algorithm by modified MUSIC failed to eliminate a substantial number of these errors. Therefore the ES system would not be able to perform its function in this low angle region using existing super resolution methods.

SUMMARY OF THE INVENTION

An object of the present invention is to provide a method and apparatus to predict the next AOA measurement, and compare this prediction with the actual measurement after multipath processing.

Yet another object is to provide a means and method, in this comparison, to determine which of three causes predominated in creating the difference between predicted and actual measurements. The three possible causes are: system thermal and bias error on the phase measurement; ambiguity resolution error due to multipath effects; and prediction error due to target motion.

Still another object of the invention, if a gross error or multipath signal is detected as the estimated AOA, is to substitute the predicted AOA for the measured AOA.

It is a further object of the gross error and multipath post processor to use information from the conventional ambiguity resolution algorithm for the array to determine if the difference in predicted AOA and measured AOA is accounted for by an array gross error rather than a target maneuver.

These and other objects of the present invention are achieved by a method to detect and eliminate interferometer angle of arrival (AOA) estimate errors due to large intermittent phase measurement errors, such as those created by specular and diffuse simultaneous multipath, including measuring signal angle-of-arrival induced phase between sensor pairs and simultaneously processing this phase to detect multiple correlated signals, separating a direct signal path phase contribution to the measured phase from indirect signal path contributions, resolving phase measurement modulo one cycle ambiguities, computing an AOA measurement to a signal source from the direct path resolved phase, saving the AOA measurement, and the time the phase measurements were made, predicting, when a new set of sensor-pair phases are measured, the current AOA from the previously saved AOA measurements and times, where the predicted AOA is made to correspond to the time of the current phase measurements, comparing the predicted AOA to the measured current AOA and rejecting the measured AOA if the comparison falls outside an acceptance window, and substituting the predicted AOA for the measured AOA if the measured AOA is rejected.

The foregoing and other objects of the present invention detect and eliminate interferometer angle of arrival (AOA) estimate errors due to large intermittent phase measurement errors, such as those created by specular and diffuse simultaneous multipath, including measuring means for measuring signal angle-of-arrival induced phase between sensor pairs and simultaneously processing this phase to detect multiple correlated signals, separating means for separating a direct signal path phase contribution to the measured phase from indirect signal path contributions, resolving means for resolving phase measurement modulo one cycle ambiguities, computing means for computing an AOA measurement to a signal source from the direct path resolved phase, saving means for saving the AOA measurement, and the time the phase measurements were made, predicting means for predicting when a new set of sensor-pair phases are measured, the current AOA from the previously saved AOA measurements and times, where the predicted AOA is made to correspond to the time of the current phase measurements, comparing means for comparing the predicted AOA to the measured current AOA and rejecting the measured AOA if the comparison falls outside an acceptance window, and substituting means for substituting the predicted AOA for the measured AOA if the measured AOA is rejected.

This present invention advantageously eliminates the critical deficiencies of current multipath interferometer processing demonstrated in the field test described with respect to FIGS. 2a and 2b, and in particular the present invention substantially improves AOA estimation accuracy and reliability when utilizing super resolution algorithms. The present invention also overcomes the data-gap drawback of data editing methods, especially for emitters at low elevations. The present invention does this by detecting phase processing errors and substituting correct AOA estimates for the corrupt ones. In the preferred implementation, the detection and substitution time extends only slightly the super resolution or data editing processing time. By thus requiring little additional processing time, the present invention allows the interferometer to output accurate angle estimates at the receiver's emitter-revisit rate for all emitter-array geometries and signal polarizations. The present invention eliminates both the gross errors caused by abnormally large phase noise variance, typically created by diffuse multipath, and the interfering signal errors induced by specular multipath.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
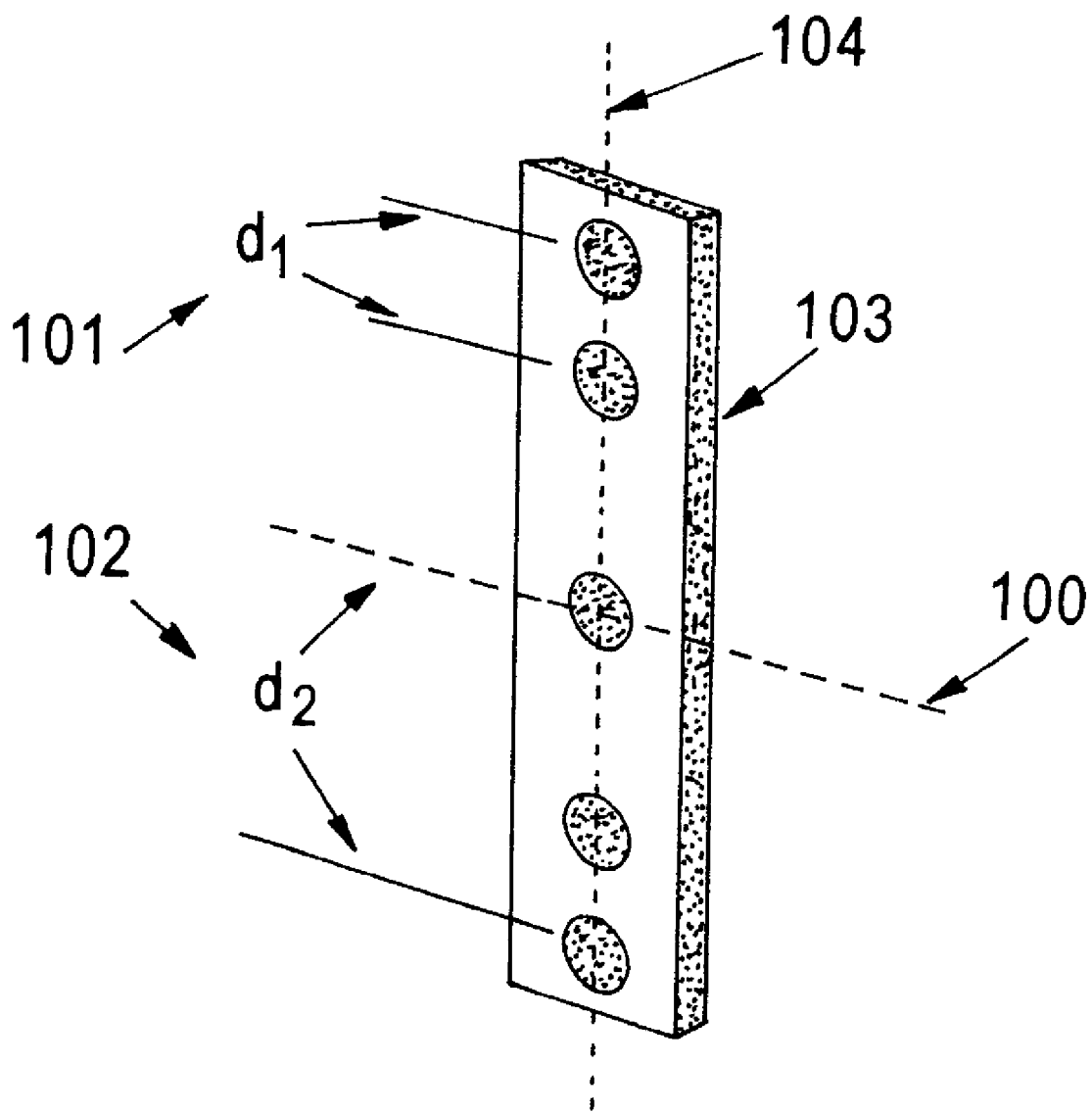
FIG. 1 depicts a prior art interferometer array where the antenna placement has a folding symmetry required by the modified MUSIC's decorrelation processing.
Figure 2A:
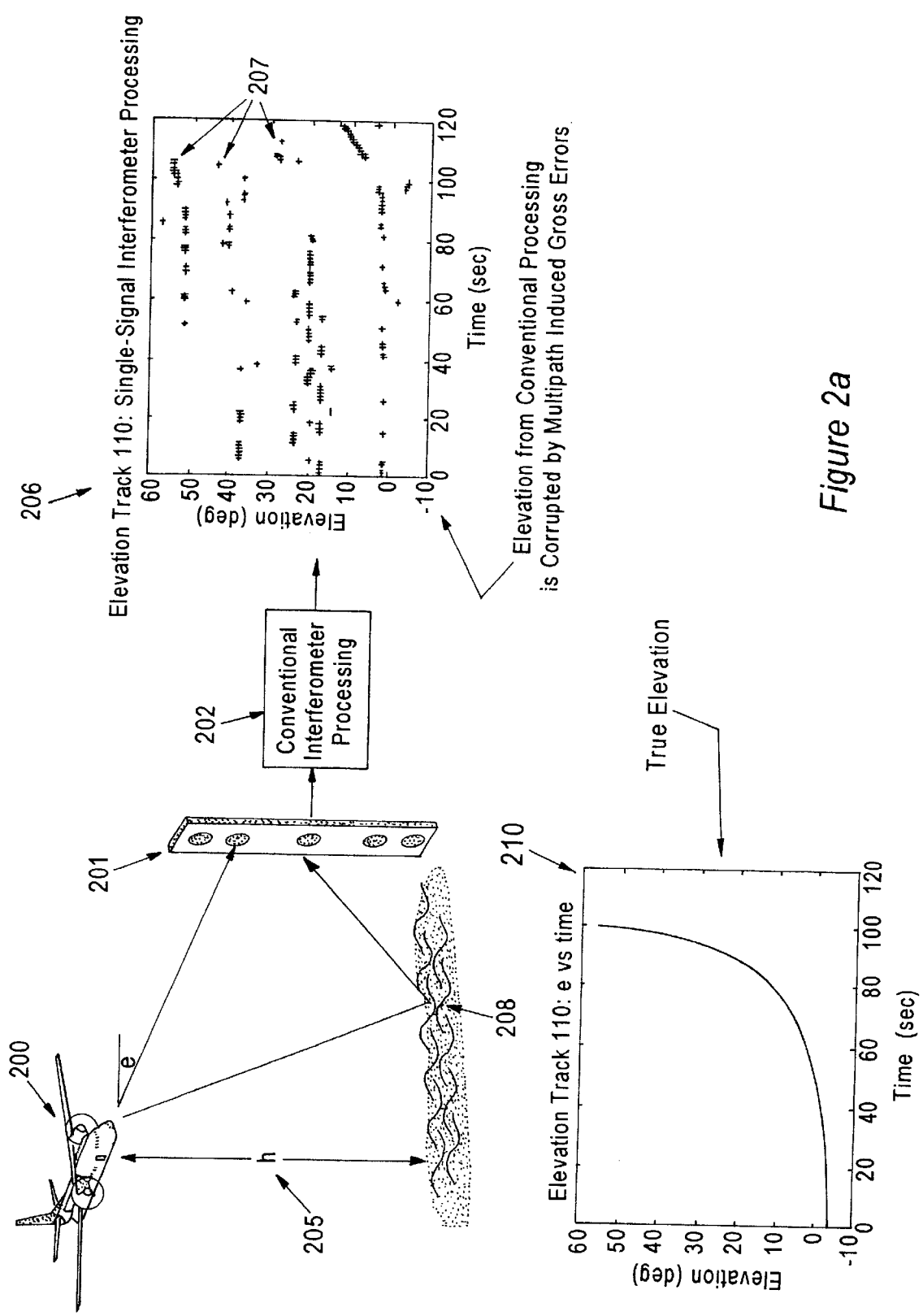
FIGS. 2a and 2b illustrate the result of making phase measurements during field tests with the interferometer of FIG. 1 used as an elevation array.
Figure 2B:
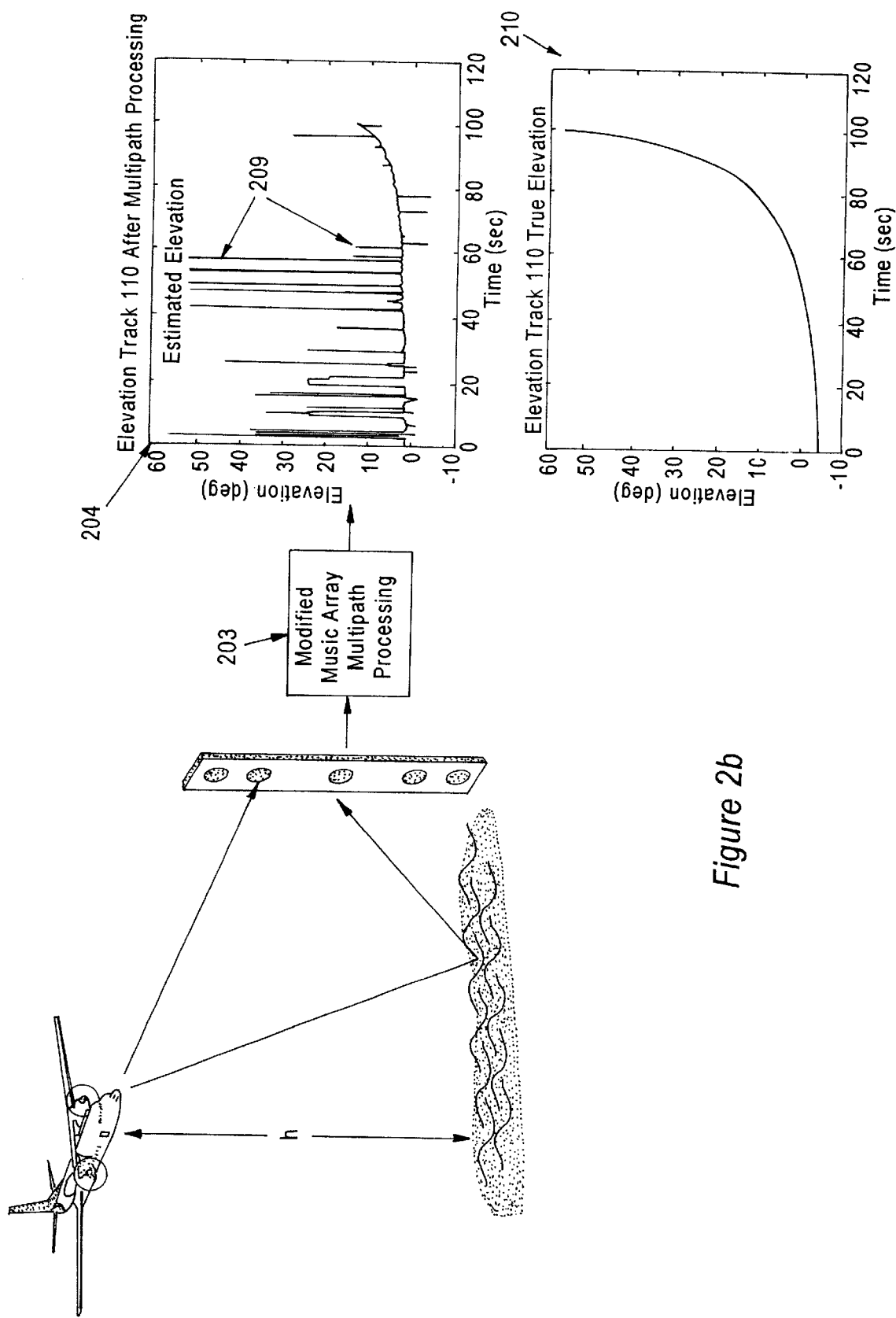
Figure 3:
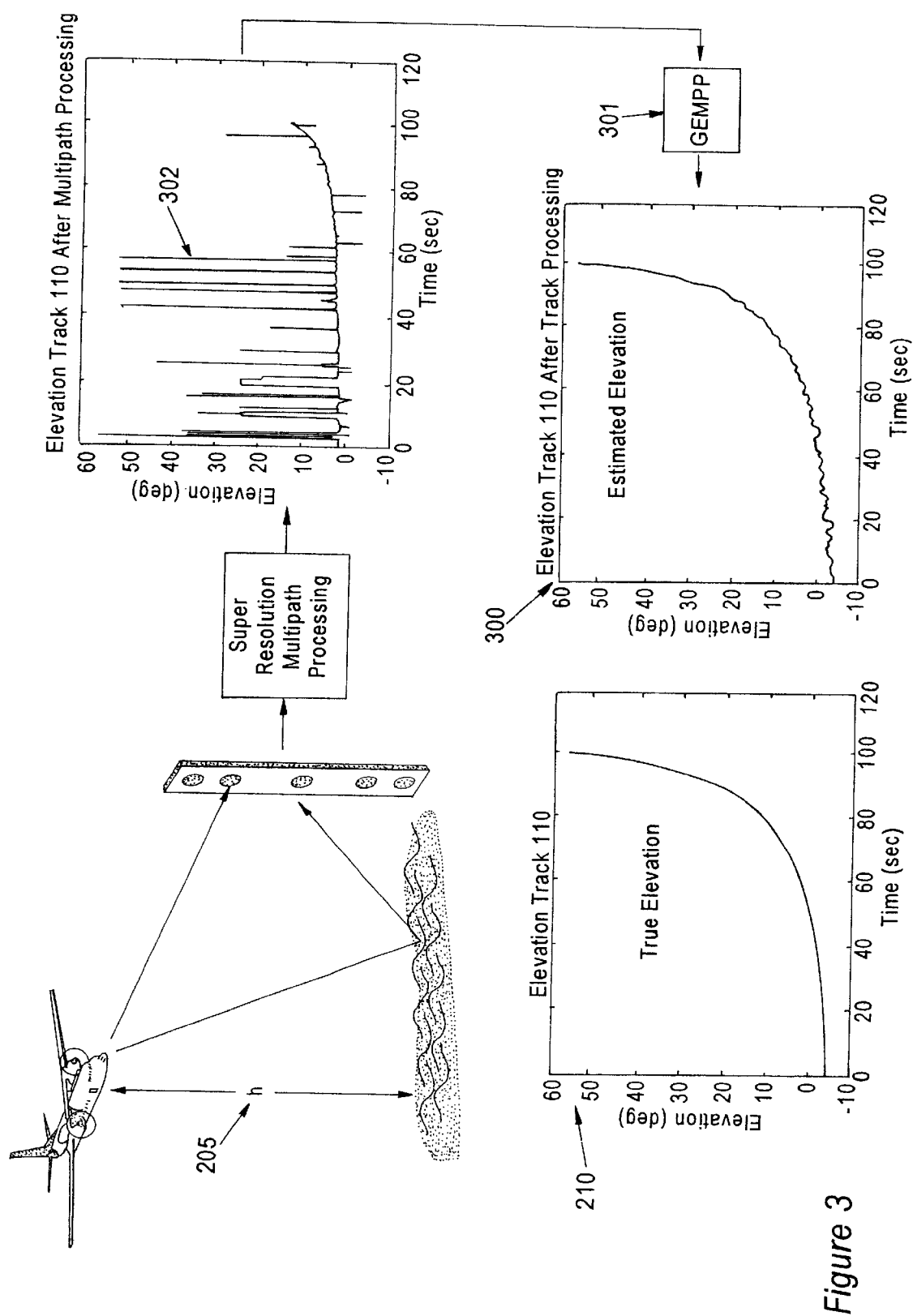
FIG. 3 demonstrates that the method of the present invention, by doing further processing on the measured AOA after the super resolution algorithm, can eliminate substantially all errors which are unavoidable when the conventional single-signal method and MUSIC are used alone.

The method according to the principles of the present invention is referred to herein as Gross Error and Multipath Post Processing (GEMPP). The ability of GEMPP to eliminate the flight test data processing errors 302 is shown by the GEMPP 301 output 300 in FIG. 3 which compares very favorably to the true elevation data 210. The following summary describes how GEMPP achieves this improved performance.

Figure 4:
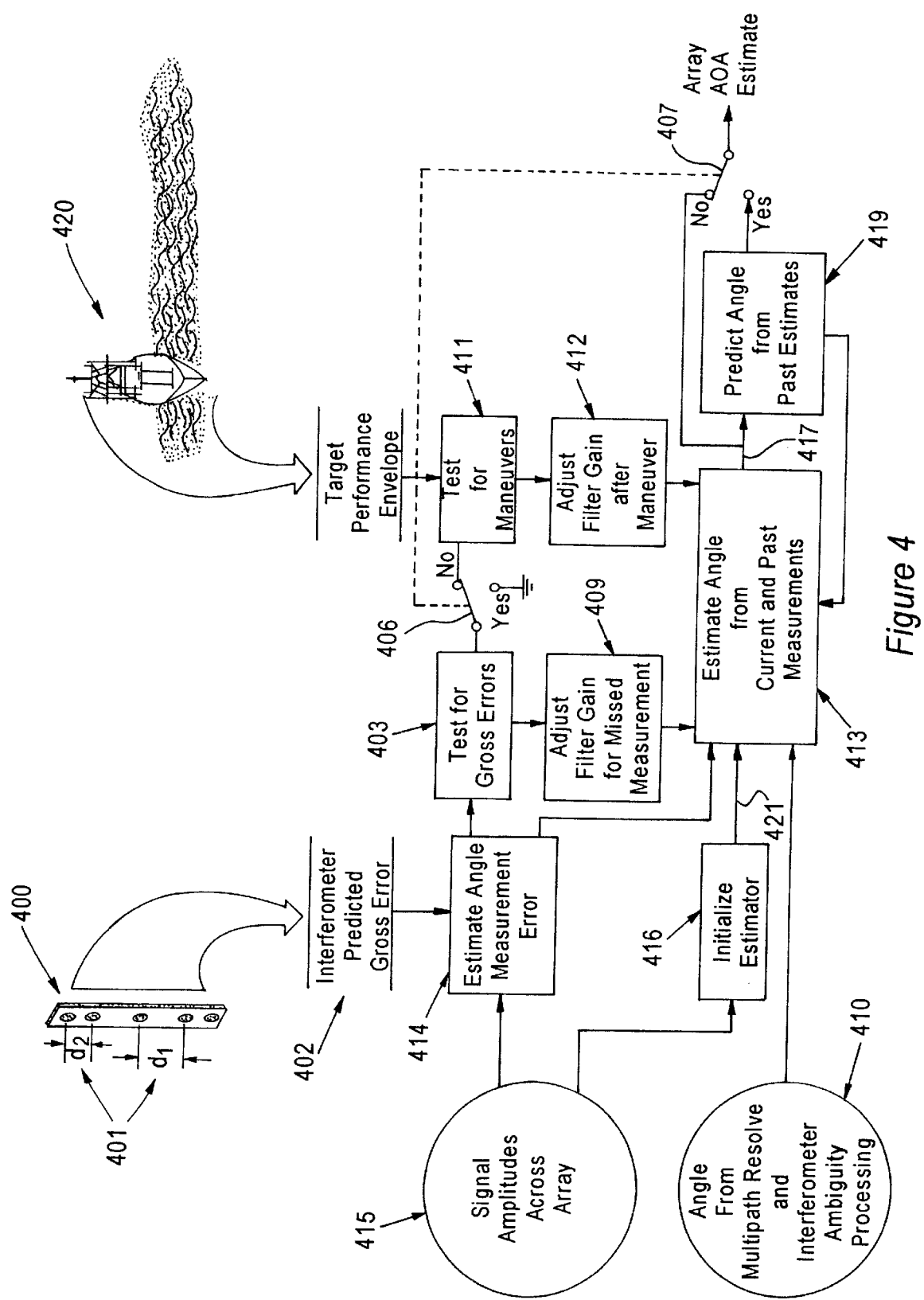
FIG. 4 is a block diagram representation of the invention used to obtain the results illustrated in FIG. 3.

Refer now to FIG. 4. An interferometer array 400 has characteristic spacings 401 ($d_1$ and $d_2$) between the antennas, also referred to as the baselines. These spacings determine the spatial angle gross errors can have relative to the true AOA. The spacings are chosen so that a gross error AOA is offset by several degrees from the correct value. The array can be constructed so that this difference is much greater than the change in elevation the emitter undergoes due to a maneuver 420 occurring between updates. To assure the predicted AOA is as accurate as possible, all valid past AOA estimates are used to generate the predicted value. To assure that this weighted value of past estimates closely matches the true value, GEMPP adjust the weights adaptively, based on the level of emitter acceleration detected. In FIG. 4, reference number 420 illustrates a missile performing a pop-up maneuver. Such a maneuver is typical of the emitter acceleration detected by GEMPP. The gross-error to true-value differences depend on the baselines 401 and the ambiguity resolution algorithm used. Thus, the gross-error to true-value differences can be precomputed and stored in 402. Typically only the value for the longest baseline is required to establish the threshold in the gross error test 403.

This test uses the gross error point from file 402 to determine if the AOA predicted-to-measured difference is due to incorrect ambiguity resolution.

If so, the gross error test 403 triggers a rejection of the measurement. This rejection is represented by opening switches 406 and 407. Opening switch 406 prevents the maneuver detector 411 from incorporating the bad measurement into it's estimation memory. Switch 407 outputs the predicted AOA obtained by extrapolation from past good measurements, rather than the current measurement. But data rejection further involves the step of 409, adjusting the filter gain for a missed measurement.

Maneuver adaption 411 also involves a gain adjustment 412. But maneuver adaption 411 does not reject a measurement. Rather maneuver adaption 411 changes the measurement's weighting, via the gain as modified by 412, in updating the AOA estimate.

Process 414, Estimate Angle Measurement Error can utilize system calibration data 415 and real time measurements of the amplitude, including the amplitude variations a multipath standing wave creates across the array elements. Or process 414 can simply use an average SNR across all the elements to predict thermal noise. The preferred implementation of process 413 is as an adaptive estimator utilizing test 411 to not just detect emitter maneuvers, but to also compensate for modeling inaccuracies in 414 and 413 described below.

But even if signal amplitude variation measurements are not required for the measurement noise calculation, they are required to do Estimator Initialization 416. To generate the angle estimate 417 used to produce the predicted AOA 418, past measurements are weighted. But if, in initially starting the weighting process, before the tests 403 and 411 are available, multipath corrupted measurements are used, the subsequent gross error and multipath post processing will fail. To prevent this, initially only AOA measurements 421 associated, by process 416 with phase measurements whose antenna-pair amplitude measurements are close, get used. The number of sequential measurements required to satisfy this criteria depends on the order of the estimator used in 413. Order refers to the number of elements in the estimator state vector. The initial estimate for the state elements requires solving a set of simultaneous equations, with each equation based on a separate AOA measurement. Thus a second order estimator initially requires two sequential AOA measurements guaranteed to not be multipath corrupted. It is highly desirable to keep the estimator order as low as possible to reduce the number of AOA measurements needed for initialization. But the order cannot be reduced below the value required to accurately extrapolate the last AOA update to the current measurement time, i.e. do the AOA prediction 419 which is central to the invention.

Figure 5:
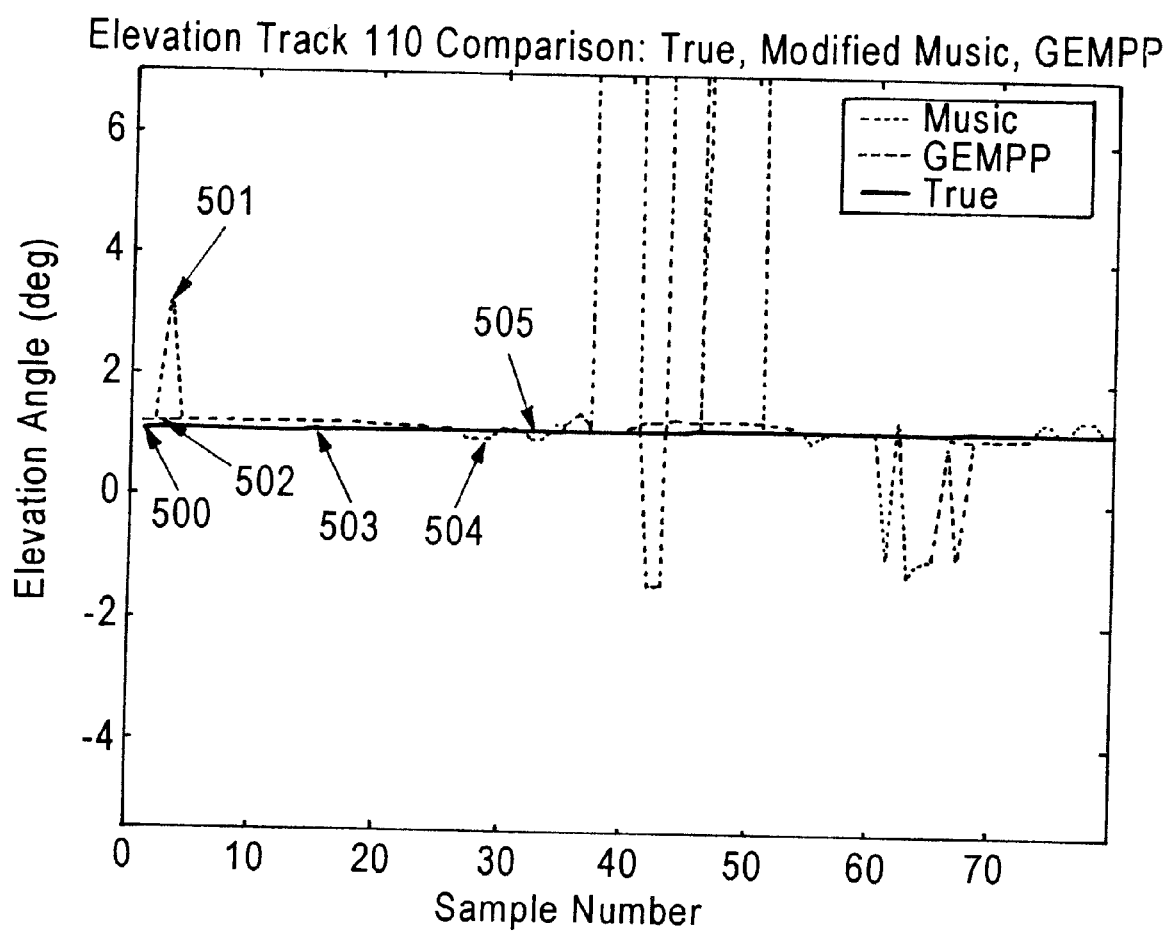
FIG. 5 illustrates the advantage to implementing the estimator in the invention as a second order recursive filter, using data from the Litton field test.

Because of the importance of using a low order estimator, a second order implementation was extensively exercised on the Litton field test data. But there are other features required of the estimator 419 implemented in the post processor. To avoid large memory requirements it is most desirable that a recursive estimator be used in process 413. The basic theory of designing such estimators is contained in *Lectures on Weiner and Kalman Filtering,* Thomas Kailath, Springer-Verlag, New York, 1982. Then just the last estimate of AOA 417, and current measured AOA 410 are required to estimate the angle. In doing the weighted estimate recursively the last estimated AOA is extrapolated forward to the current measurement time. The extrapolation equations used to do this in process 419, Predict Angle from Past Estimate, are also most conveniently used to do the extrapolation for the recursive algorithm. If the extrapolation or prediction equations can be reduced to a simple polynomial model, then the second order estimator uses a simple linear predictor, and initializing the post processor requires solving two linear equations. This is desirable because it is fast to execute, and requires just two good AOA measurements. FIG. 5 illustrates these advantages on data collected during the Litton field test. Soon after the post processor started 500 it was perturbed by a spurious AOA 501 the modified MUSIC algorithm generated. But process 419 was able to predict 502 through this AOA immediately after initialization and before any substantial smoothing in process 413 was done. FIG. 5, 503 shows the true elevation computed from aircraft navigation data during post flight analysis. The second order estimator was also able to smooth through 505 perturbations 504 due to increased phase noise.

These results indicate that a second order recursive linear estimator is adequate to do the smoothing 413 and predictive functions 419 of the post processor. These results also indicate how such an estimator handles gaps in measurement updates because of data rejection by process 403. For example, the AOA spike 501 was detected by the process 403 test for gross errors. The threshold was set so that the 2° change in angle from one update to the next was sufficient to indicate a spurious AOA measurement, even though the initialization process had just finished. FIG. 5, 502 indicates the predicted AOA, substituted for the measured AOA, had an accuracy consistent with past measurements.

Figure 6:
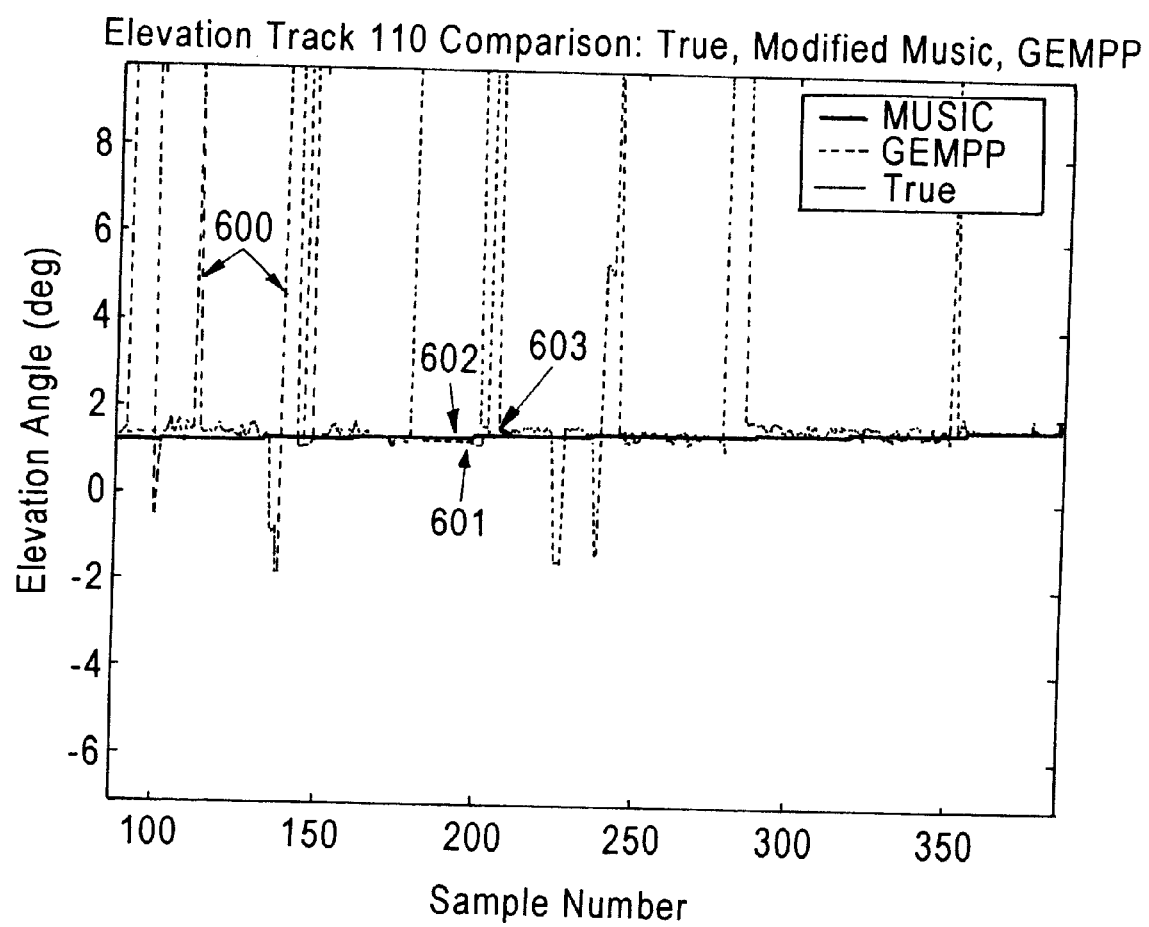
FIG. 6 illustrates, using field test data, the ability of the present invention to provide accurate AOA estimates when longer data gaps occur after the estimation process is well established.

FIG. 6 provides detail on performance when longer data gaps occur after the estimation process is well established. It is not surprising that much larger errors 600 than 501 are rejected by process 403. But because of the frequency of error occurrence in the super resolution processor's output, and hence measurement rejection by 403 in FIG. 4, the predictor 419, using the second order polynomial model, begins to drift off 601 from the true elevation 602. When it receives a good measurement 603 the test for maneuver process 411 adjusts the weights or gains so that the estimator pulls back to the measured AOA. Thus process 411 functions not simply to adjust to angle change created by emitter accelerations 420, but also to enable rapid reconvergence after a series of missed measurements. By doing this process 411 and 412 are especially key elements in enabling the invention to meet its objectives. Process 411 and 412 compensate for the use of a low order state model in the actual estimation process, but provide smoothing adequate to span longer data gaps. Whereas the low order model is good for rapid initialization, it is detrimental for predicting across several missed measurements. Processes 411 and 412 mitigate this drawback.

Figure 7A:
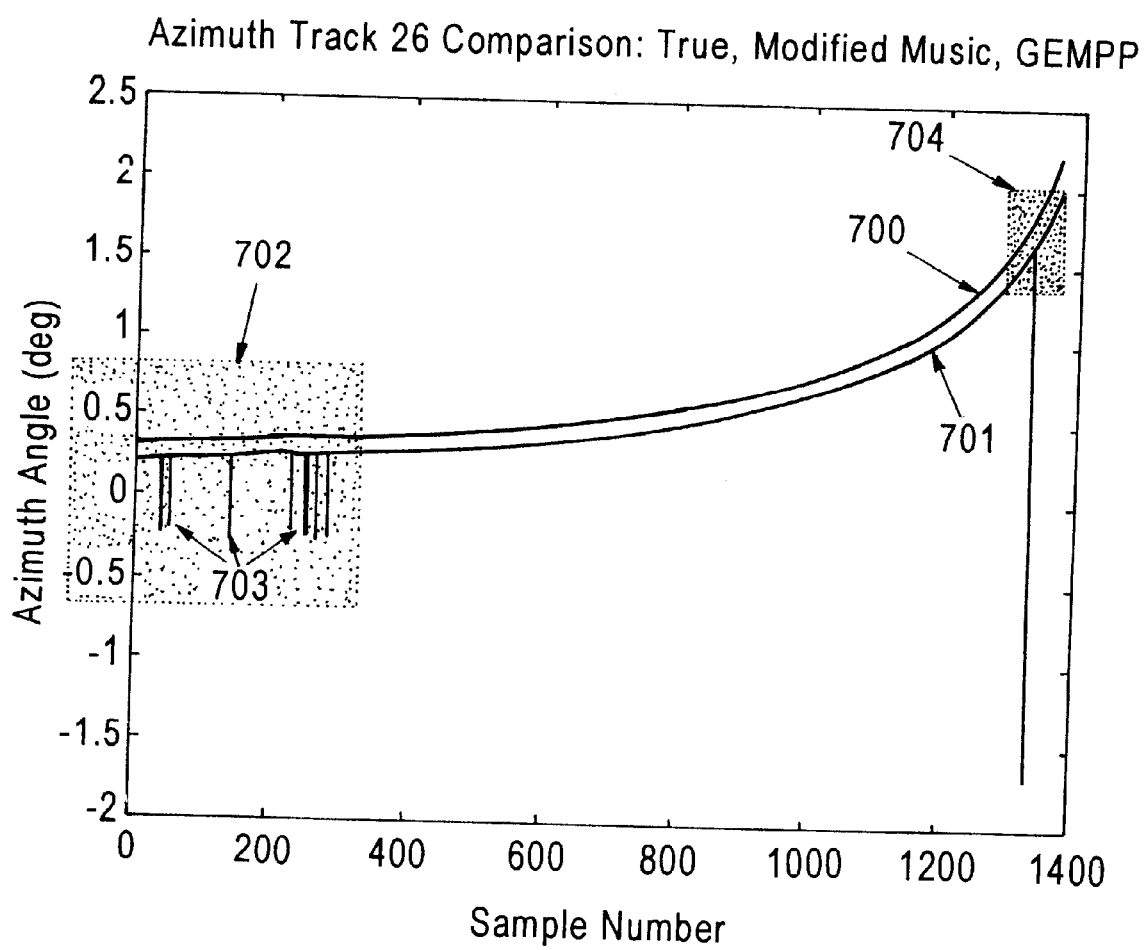
FIG. 7a shows, using performance generated from field test data collected with the array of FIG. 1 used as an azimuth array, the ability of the present invention to differentiate between changes in azimuth due to emitter motion, and changes in azimuth due to gross errors created by diffuse multipath.

In higher order estimators the process 411 Test for Maneuver functions mainly as a target acceleration detector. As its name implies, it performs this function as a primary task in lower order implementations also. During the Litton field test, the aircraft carrying the radar emitter flew over the interferometer array installation. Thus azimuth 700 (FIG. 7a) changed rapidly. The second order post processor implementation was able to track 701 this change precisely. The offset between the predicted elevation and true AOA is due to surveying error in the interferometer site installation, and not an effect intrinsic to the post processor. The estimator's response to the changing AOA is controlled by process Adjust Filter Gain after Maneuver 412 (FIG. 4). But it is most desirable to expedite the adjustment, since all the gross error and multipath processing must be completed within several milliseconds after receiving the measured AOA 410. In the second order implementation whose performance is shown here, the filter gains were precomputed as a function of the integer representing the number of times k the filter was cycled. The same method was used to adjust the gain in process 409 when a measurement was skipped. Here the predicted error's growth as a function of the number of missed measurements must be estimated and related to a prior value of k The ability to simplify these adaptive processes is another important benefit of the use of a lower order model when implementing the post processor.

Figure 7B:
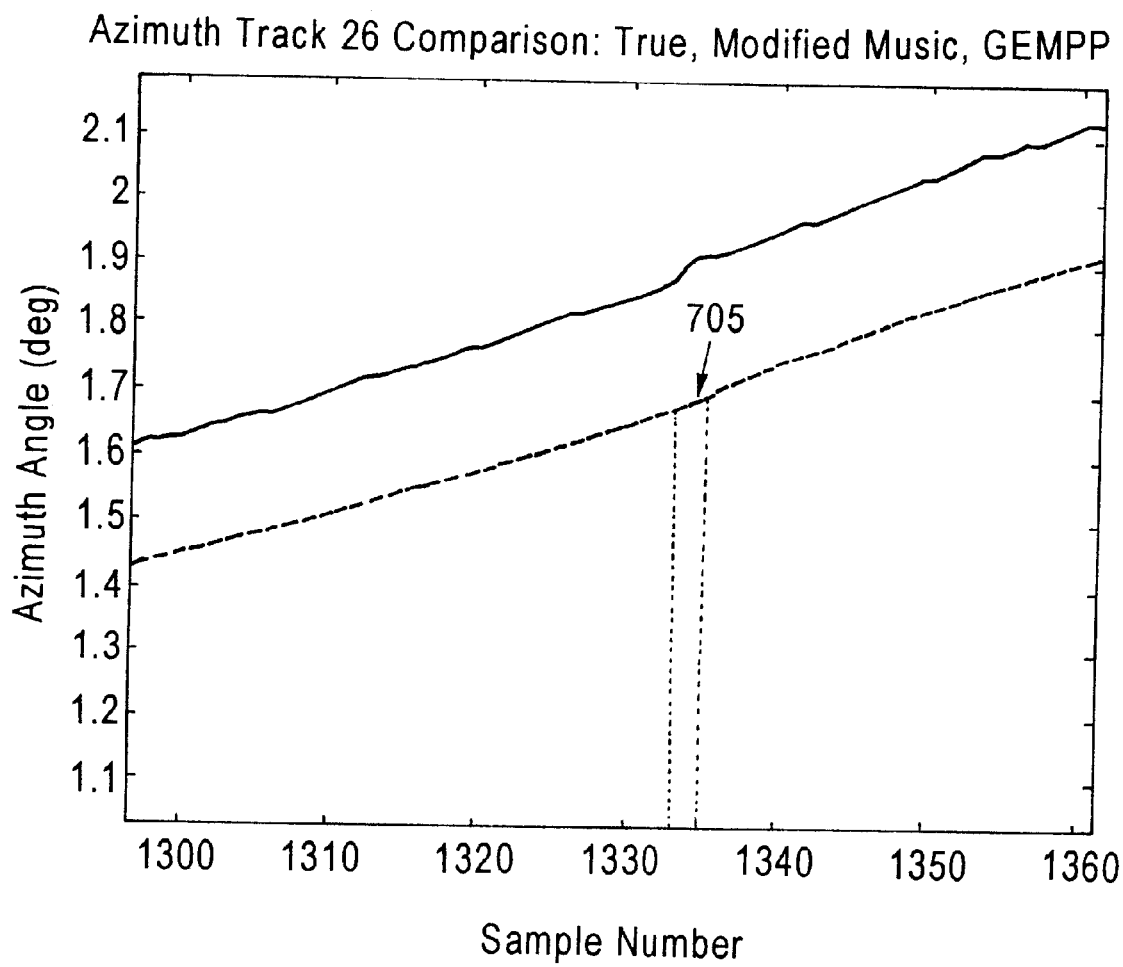
FIG. 7b illustrates that, using the preferred low order estimator, the predictor can accurately extrapolate to new AOAs even during periods of rapid angle change caused by emitter motion, and that the extrapolated AOA is a robust replacement for the measured AOA when gross errors are detected.

Diffuse multipath creates gross errors the super resolution processing cannot detect. The area 702 (FIG. 7a) shows such gross errors 703. Note that angle difference between the gross errors and correct value is on the order of 1°. This shows that the gross error detector 403 does not require a large absolute magnitude change to detect a gross error. Rather the change rate over time is what is used to differentiate between a gross error, resulting in measurement deletion, and maneuver detection 411, resulting in a change in measurement weighting 412 in the filter estimate. In the second order implementation tested this change rate response was controlled by a first order filter smoothing in process 411. Switch 406 prevents this smoother from getting a corrupted AOA measurement. Finally, area 704, which experienced a large multipath error due to the deficiencies of the modified MUSIC processing, is shown enlarged in FIG. 7b. Reference No. 705 indicates the accuracy with which the low order predictor 419 is able to compensate for the corrupt measured AOA. The ES subsystem would output estimate 705 to the radar and emitter tracker, and the poor performance of the super resolution algorithm would not affect overall system performance in this critical low-elevation region.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only b the definition contained in the appended claims and equivalents thereof.

What is claimed is:

1. A method to detect and eliminate interferometer angle of arrival (AOA) estimate errors due to large intermittent phase measurement errors, such as those created by specular and diffuse simultaneous multipath, comprising:

(a) measuring signal angle-of-arrival induced phase between sensor pairs and simultaneously processing this phase to detect multiple correlated signals;

(b) separating a direct signal path phase contribution to the measured phase from indirect signal path contributions;

(c) resolving phase measurement modulo ambiguities;

(d) computing an AOA measurement to a signal source from the direct path resolved phase;

(e) saving the AOA measurement, and the time the phase measurements were made;

(f) predicting, when a new set of sensor-pair phases are measured, the current AOA from the previously saved AOA measurements and times where the predicted AOA is made to correspond to the time of the current phase measurements;

(g) comparing the predicted AOA to the measured current AOA and rejecting the measured AOA if the comparison falls outside an acceptance window; and (h) substituting the predicted AOA for the measured AOA if the measured AOA is rejected.

2. The method of claim 1, wherein the comparison in step (g) is an angle difference, and the AOA measurement rejected if this angle difference is larger than the comparison window, where the comparison window is determined by the steps of:

(a) computing a set of possible gross error AOA corresponding to the direct signal path ambiguous phase, where this set is determined by the sensor element spacings;

(b) forming the set of differences of the measured AOA with each gross error AOA; and (c) choosing the minimum difference from this set scaled to form the acceptance window.

3. The method of claim 1 wherein step (f) comprises:

(a) saving a phase measurement signal-to-noise ratio (SNR) and an estimate of the phase measurement calibration error, along with the AOA and time the phase measurements were made;

(b) estimating phase measurement error standard deviation from the SNR and the phase measurement calibration error;

(c) computing a weighting function or gain for each AOA measurement, the magnitude of this weighting function inversely proportional to the phase measurement error standard deviation (STD);

(d) estimating the last AOA and the rates of change of the last AOA by a linear weighting of the past AOA with these gains;

(e) predicting the current AOA utilizing the weighted estimate of the last AOA and the rates of change of the last AOA.

4. The method of claim 3 wherein step (c) is modified to account for signal source accelerations, comprising:

(a) forming the difference of the measured AOA and predicted AOA;

(b) predicting the standard deviation of this difference from the gains computed in step (c) and phase measurement error computed in step (b) to form a normalized difference;

(c) comparing the absolute value of this difference with a multiple of the predicted standard deviation;

(d) adjusting the gain if the absolute value of the difference is greater than the multiple, the adjustment altering the gain so that more weight is placed on the current AOA measurement, the adjustment being proportional to the magnitude of the difference.

5. The method of claim 4 wherein the multiple value in step (c) is found from flight performance data for the emitters of interest, comprising the steps of:

(a) determining a maneuver generating the greatest change in elevation for each emitter, and (b) determining the closest range this maneuver can occur for each emitter; and (c) determining from (a) and (b) and the acceptance window the magnitude of the multiple that will provide a given confidence that when a normalized difference from steps (a) and (b) exceeds this value, the cause was target motion and not a phase processing gross error.

6. The method of claim 4 wherein the sensor spacings are chosen so that the constraint window formed is several times larger than an acceleration bound multiple.

7. The method of claim 4, wherein the multiple is determined to allow a lower order estimator to reconverge rapidly after a series of missed measurements.

8. The method of claim 4 wherein an abrupt change is detected in AOA and the comparison in step (c) detects a gradual change in AOA, comprising:

smoothing the predicted AOA and measured AOA difference; and predicting the standard deviation of the smoothed difference estimate logic to utilize the smoothed difference and multiple of the predicted standard deviation to prevent differences from being input to the smoother when these differences involve a rejected AOA measurement.

9. An apparatus to detect and eliminate interferometer angle of arrival (AOA) estimate errors due to large intermittent phase measurement errors, such as those created by specular and diffuse simultaneous multipath, comprising:

(a) measuring means for measuring signal angle-of-arrival induced phase between sensor pairs and simultaneously processing this phase to detect multiple correlated signals;

(b) separating means for separating a direct signal path phase contribution to the measured phase from indirect signal path contributions;

(c) resolving means for resolving phase measurement modulo one cycle ambiguities;

(d) computing means for computing an AOA measurement to a signal source from the direct path resolved phase;

(e) saving means for saving the AOA measurement, and the time the phase measurements were made;

(f) predicting means for predicting when a new set of sensor-pair phases are measured, the current AOA from the previously saved AOA measurements and times, where the predicted AOA is made to correspond to the time of the current phase measurements;

(g) comparing means for comparing the predicted AOA to the measured current AOA and rejecting the measured AOA if the comparison falls outside an acceptance window; and (h) substituting means for substituting the predicted AOA for the measured AOA if the measured AOA is rejected.

10. The apparatus of claim 9, wherein the comparing means compare an angle difference, and the AOA measurement rejected if this angle difference is larger than the comparison window and where the comparison window is determined by comparing means by:

(a) computing a set of possible gross error AOA corresponding to the direct signal path ambiguous phase, where this set is determined by the sensor element spacings;

(b) forming the set of differences of the measured AOA with each gross error AOA; and (c) choosing the minimum difference from this set to form the acceptance window.

11. The apparatus of claim 9 wherein said predicting means comprises:

(a) saving means for saving a phase measurement signal-to-noise ratio (SNR) and an estimate of the phase measurement calibration error, along with the AOA and time the phase measurements were made;

(b) estimating means for estimating phase measurement error standard deviation from the SNR and the phase measurement calibration error;

(c) computing means for computing a weighting function or gain for each AOA measurement, the magnitude of this weighting function inversely proportional to the phase measurement error standard deviation (STD);

(d) estimating means for estimating the last AOA and the rates of change of the last AOA by a linear weighting of the past AOA with these gains;

(e) predicting means for predicting the current AOA utilizing the weighted estimate of the last AOA and the rates of change of the last AOA.

12. The apparatus of claim 4 wherein said computing means is modified to account for signal source accelerations by:

(a) forming the difference of the measured AOA and predicted AOA;

(b) predicting the standard deviation of this difference from the gains computed in step (c) and phase measurement error computed in step (b) to form a normalized difference;

(c) comparing the absolute value of this difference with a multiple of the predicted standard deviation;

(d) adjusting the gain if the absolute value of the difference is greater than the multiple, the adjustment altering the gain so that more weight is placed on the current AOA measurement, the adjustment being proportional to the magnitude of the difference.

13. The apparatus of claim 12 wherein the multiple value is found from flight performance data for the emitters of interest by:

(a) determining a maneuver generating the greatest change in elevation for each emitter, and (b) determining the closest range this maneuver can occur for each emitter; and (c) determining from (a) and (b) and the acceptance window the magnitude of the multiple that will provide a given confidence that when a normalized difference from steps (a) and (b) exceeds this value, the cause was target motion and not a phase processing gross error.

14. The apparatus of claim 4 wherein the sensor spacings are chosen so that the constraint window formed is several times larger than an acceleration bound multiple.

15. The apparatus of claim 4, wherein the multiple is determined to allow a lower order estimator to reconverge rapidly after a series of missed measurements.

16. The apparatus of claim 4 wherein a gradual change in AOA is rendered detectable as well as an abrupt change by:

smoothing the predicted AOA and measured AOA difference;

predicting the standard deviation of the smoothed difference estimate; and employing logic to utilize the smoothed difference and multiple of the predicted standard deviation to prevent differences from being input to the smoother when these differences involve a rejected AOA measurement.

* * * * *